United States Patent
Rudelic

(10) Patent No.: US 7,398,381 B2
(45) Date of Patent: Jul. 8, 2008

(54) UTILIZING PAGING TO SUPPORT DYNAMIC CODE UPDATES

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 441 days.

(21) Appl. No.: 11/009,563

(22) Filed: Dec. 10, 2004

(65) Prior Publication Data

US 2006/0129794 A1   Jun. 15, 2006

(51) Int. Cl.
  *G06F 15/177*   (2006.01)
  *G06F 9/00*     (2006.01)
  *G06F 1/24*     (2006.01)

(52) U.S. Cl. .................. 713/2; 713/1; 713/100

(58) Field of Classification Search .......... 713/2
  See application file for complete search history.

(56) References Cited

U.S. PATENT DOCUMENTS

| | | | |
|---|---|---|---|
| 5,594,903 A | * | 1/1997 | Bunnell et al. ............... 717/162 |
| 5,737,585 A | * | 4/1998 | Kaneshima ................... 703/20 |
| 6,205,548 B1 | | 3/2001 | Hasbun |
| 6,237,091 B1 | * | 5/2001 | Firooz et al. .................. 713/1 |
| 2002/0069342 A1 | * | 6/2002 | Ginsberg ..................... 711/209 |
| 2004/0015960 A1 | | 1/2004 | Wanchoo et al. |
| 2004/0268084 A1 | * | 12/2004 | Longerbeam et al. ....... 711/206 |
| 2005/0010576 A1 | * | 1/2005 | Ren et al. ..................... 707/100 |

FOREIGN PATENT DOCUMENTS

| | | |
|---|---|---|
| DE | 197 23 676 | 8/1998 |
| EP | 1 120 709 | 8/2001 |

OTHER PUBLICATIONS

*Fully Reprogrammable fault-Tolerant Flash Memory System*, IBM Technical Disclosure Bulletin, IBM Corp., New York, vol. 38, No. 8, Aug. 1, 1995.

\* cited by examiner

*Primary Examiner*—Rehana Perveen
*Assistant Examiner*—Stefan Stoynov
(74) *Attorney, Agent, or Firm*—Trop, Pruner & Hu, P.C.

(57) ABSTRACT

A code object and flash memory may be updated by storing a new code object in the flash memory. Then, a pointer from a page table may be redirected to point to the new code object. The old code object may then be deleted. As a result, code can be updated without the need for rebooting by using the memory management unit and its page table capability.

19 Claims, 5 Drawing Sheets

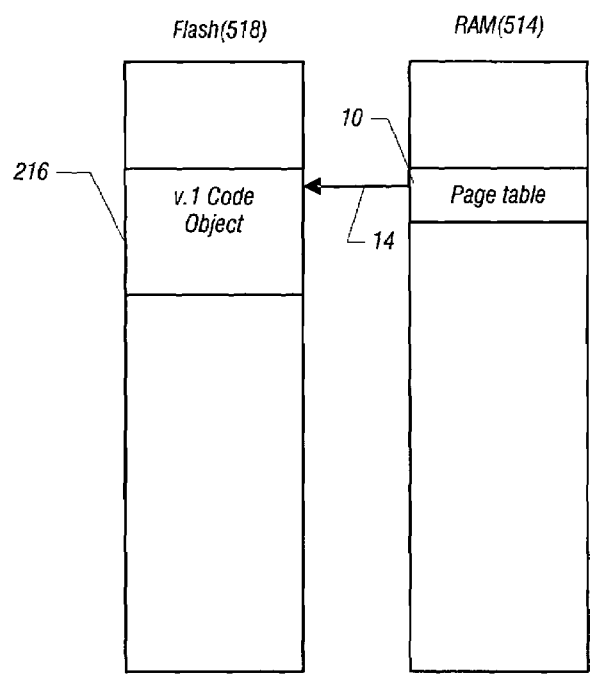
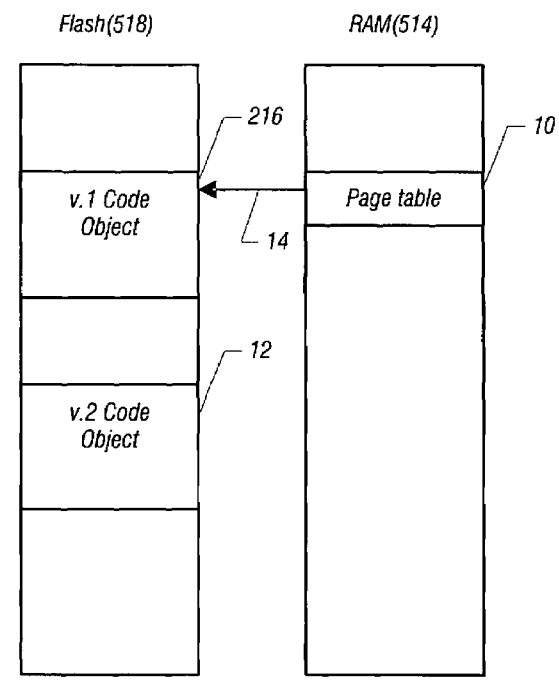
FIG. 3          FIG. 4

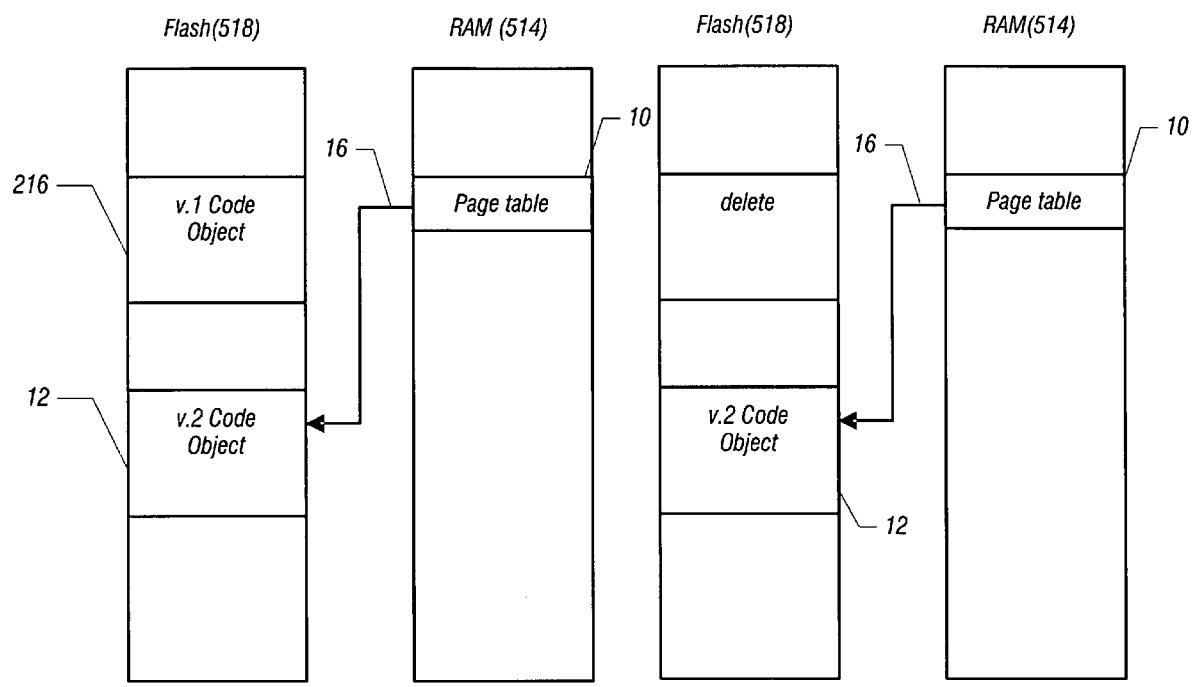
FIG. 5  FIG. 6

UTILIZING PAGING TO SUPPORT DYNAMIC CODE UPDATES

BACKGROUND

This invention relates generally enabling updates of code objects stored on a flash memory.

Typical code update mechanisms require rebooting of the processor-based system for the update to be installed. To update code objects in an execute-in-place (XiP) system, the system must be rebooted for the update to be applied.

In many cases, it is desirable to manage code, data, and files in flash memory within an open architecture. An execute-in-place system enables this advantage. However, in order to update the code in the flash memory, a reboot is generally required.

Thus, there is a need for better ways to enable updating code in flash memories that enable execute-in-place.

BRIEF DESCRIPTION OF THE DRAWINGS

FIG. 3 is a schematic depiction of a random access memory and flash file system in accordance with one embodiment of the present invention;

FIG. 4 corresponds to FIG. 3 in a different state in accordance with one embodiment of the present invention;

FIG. 5 corresponds to FIG. 4 in a different state in accordance with one embodiment of the present invention;

FIG. 6 corresponds to FIG. 5 in a different state in accordance with one embodiment of the present invention.

DETAILED DESCRIPTION

Figure 1:
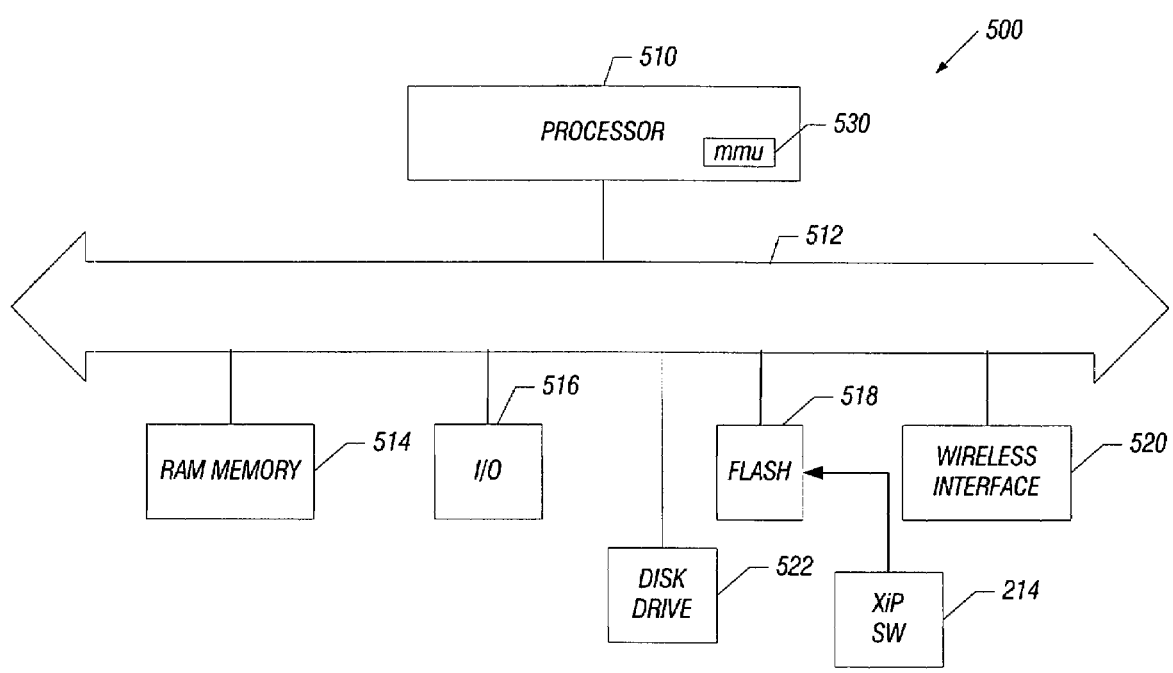
FIG. 1 is a system depiction in accordance with one embodiment of the present invention.

Referring to FIG. 1, a processor-based system 500 may be a mobile processor-based system in one embodiment. For example, the system 500 may be a handset or cellular telephone. In one embodiment, the system 500 includes a processor 510 with an integral memory management unit (MMU) 530. In other embodiments, the memory management unit 530 may be a separate chip.

The processor 510 may be coupled by a bus 512 to a random access memory (RAM) 514 and a flash memory 518. An input/output (i/o) device 516 may also be coupled to the bus 512. Examples of input/output devices include keyboards, mice, displays, serial buses, parallel buses, and the like.

A wireless interface 520 may also be coupled to the bus 512. The wireless interface 520 may enable any radio frequency protocol, in one embodiment of the present invention, including a cellular telephone protocol. The wireless interface 520 may, for example, include a cellular transceiver and an antenna, such as a dipole, or other antenna.

The memory 514 may be used to store messages transmitted to or by the system 500. The memory 530 may also optionally be used to store instructions that are executed by the processor 510 during the operation of the system 500, and may be used to store user data.

While an example of a wireless application is provided above, embodiments of the present invention may also be used in non-wireless applications as well.

The memory management unit 530 is a hardware device or circuit that supports virtual memory and paging by translating virtual addresses into physical addresses. The virtual address space is divided into pages whose size is $2^N$. The bottom N bits of the address are left unchanged. The upper address bits are the virtual page number.

The memory management unit 530 contains a page table that is indexed by the page number. Each page table entry gives a physical page number corresponding to the virtual one. This is combined with the page offset to give the complete physical address. The page table entry may also include information about whether the page has been written to, when it was last used, what kind of processes may read and write it, and whether it should be cached. The page table may originate in flash memory 518 or, as another example, may be created by the system during boot. After boot, the page table is stored in RAM 514.

The memory management unit 530 may also solve the problem of memory fragmentation. After blocks of memory have been allocated and freed, the free memory may become fragmented so that the largest contiguous block of free memory may be much smaller than the total amount of memory. With virtual memory, a contiguous range of virtual addresses can be mapped to several non-contiguous blocks of physical memory.

The memory management unit 530 may include a small amount of memory that holds a table matching virtual addresses to physical addresses. The table may be called a translation look aside buffer. All requests for data are sent to the memory management unit 530, which determines whether the data is stored in random access memory 514 or needs to be fetched from a mass storage device like a disk drive 522. If the data is not in any storage, the memory management unit 530 issues a page fault interrupt.

Figure 2:
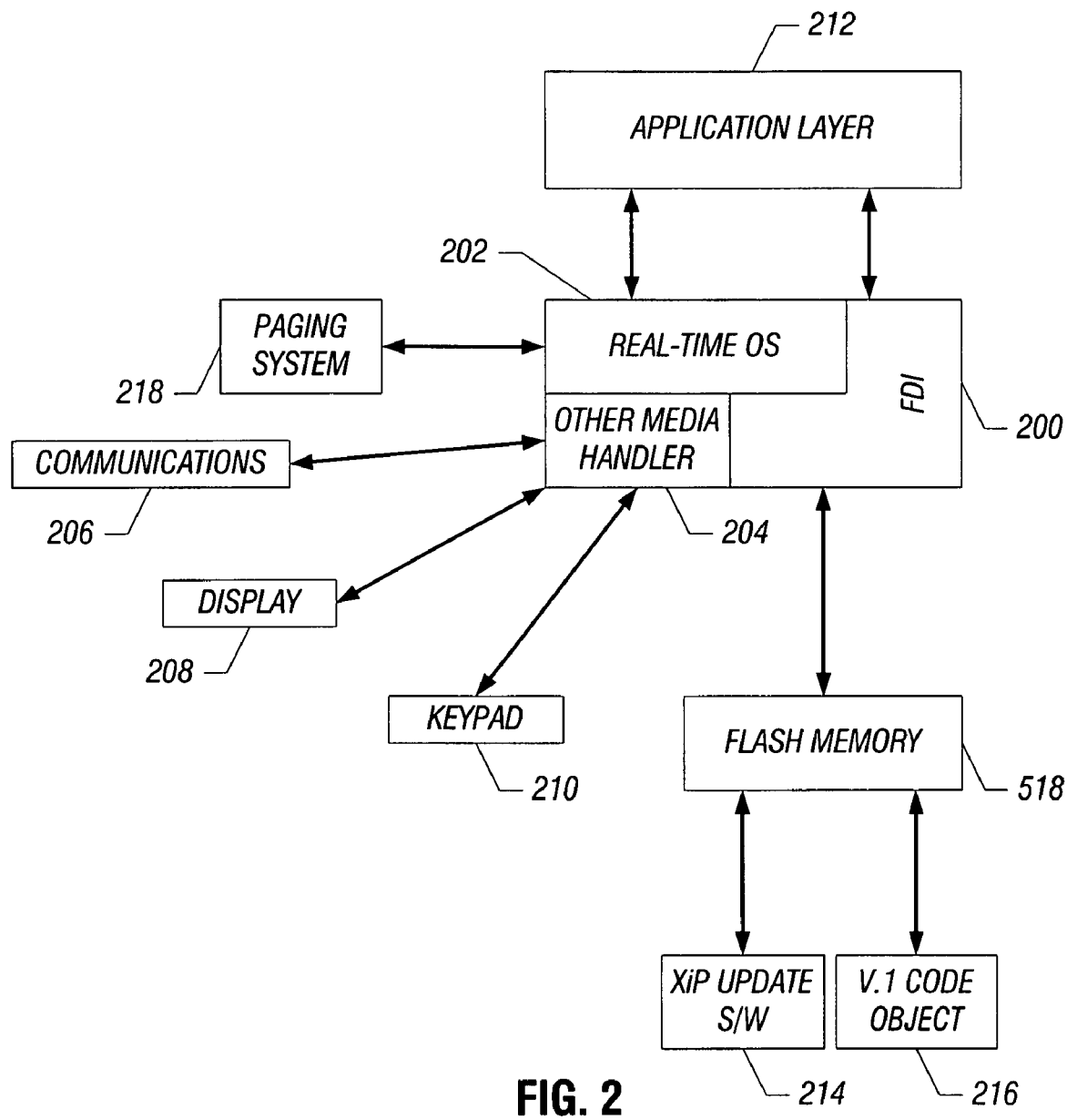
FIG. 2 is a software depiction in accordance with one embodiment of the system shown in FIG. 1.

Referring to FIG. 2, an application level depiction of the system 500 indicates an application layer 212 coupled to a real time operating system 202. The real time operating system 202 may be coupled to a flash data integrator (FDI), such as the Intel FDI version 5 available from Intel Corporation, Santa Clara, Calif. The flash data integrator 200 is a code and data storage manager for use in real time embedded applications. It may support numerically identified data parameters, data streams for voice recordings and multimedia, Java applets, and native code for direct execution.

The FDI 200 background manager handles power loss recovery and wear leveling of flash data blocks to increase cycling endurance. It may incorporate hardware-based read-while-write. The code manager within the FDI 200 provides storage and direct execution-in-place of Java applets and native code in flash memory 518. It may also include other media handlers 204 to handle keypads 210, displays 208, and communications 206. The real time operating system 218 may work with the paging system 218, implemented by the memory management unit 530.

The flash memory 518 may store an execution update software package 214 to be described hereinafter. In addition, it may store a so-called v.1 code object.

Typically, the memory management unit 530 and paging system is used for virtual memory or for loading pages for persistent storage systems to the page pool. The paging mechanism can also be utilized to dynamically hot swap an image update without notifying the user or forcing a reset of the system. Thus, the paging mechanism may be used as a tool to support a dynamic update of the flash memory 518.

Existing code update systems generally force a reset of the system to a small kernel that can modify the code image in place. This is because code that is in the process of being updated cannot be executed.

In accordance with some embodiments of the present invention, the update is loaded to a different location in the code management system. Then, the system is dynamically updated to point to the physical location of the new code. By not overwriting the image to be updated, the need for a reset can be eliminated.

Differencing technology may be used to reduce the size of the update package or the complete file can simply be installed for the new version. The paging system swaps the physical location of the updated code while maintaining the logical location of the code. Hot swap capability may be advantageous over some existing systems.

Thus, referring to FIG. 3, the flash memory 518 file system may include a v.1 code object 216, as described earlier. The random access memory 514 may store the page table 10. The page table 10 points to the v.1 code object 216 in accordance with the memory management or paging system.

As shown in FIG. 4, a v.2 code object 12 that is an updated code object may be stored in the flash file system. At this point, the pointer 14 continues to point from the page table 10 to the v.1 code object 216.

Moving to FIG. 5, the pointer 16 is redirected from the v.1 code object 216 to the v.2 code object 12. Finally, as shown in FIG. 6, the v.1 code object, which is now obsolete, may be deleted.

The paging system provides virtual memory and memory protection while executing the code from the flash memory 518. This is accomplished by loading the page table 10 with the actual physical locations of the pages in the flash memory 518. This is different from traditional paging systems where the page is located in flash memory and then copied to random access memory, loading the page table with the physical/logical translation.

Figure 7:
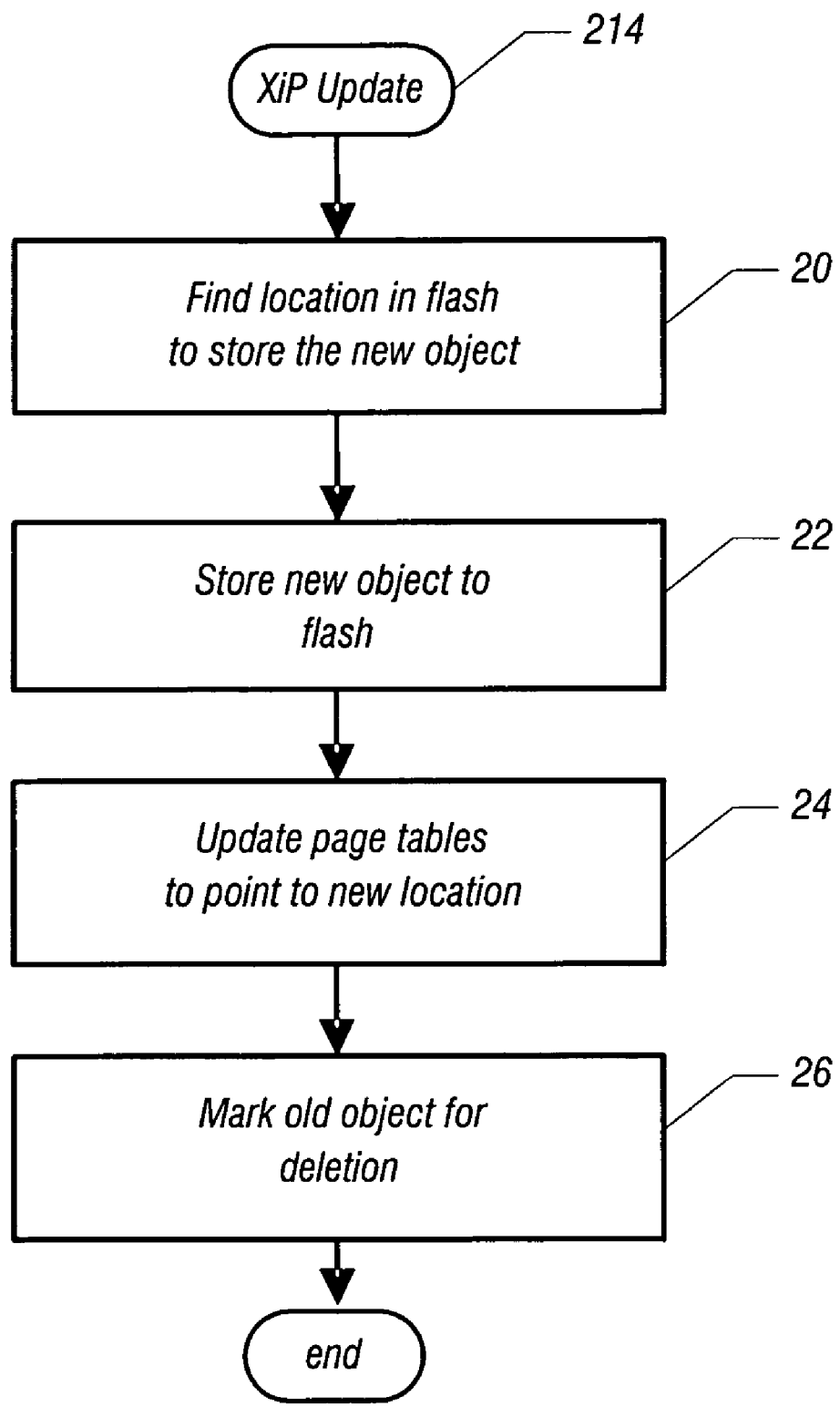
FIG. 7 is a flow chart for software in accordance with one embodiment of the present invention.

Thus, referring to FIG. 7, the execute-in-place update software 214 may be stored on the flash memory 518. The software 214 begins by finding the location in the flash memory 518 to store the new object, such as the v.2 code object 12, as indicated in block 20. The new object 12 is stored to the flash memory 518 as indicated in block 22. Then, the page tables are updated to point to the new location as indicated in block 24. Finally, the old object is marked for deletion as indicated in block 26.

In some embodiments of the present invention, updating the code in an execute-in-place system may be accomplished without rebooting. By recognizing the applicability of the memory management unit 530 and paging mechanism as a tool for swapping code in a dynamic fashion, the updating of the code is facilitated. Since the paging system normally allows the physical location of code to be different from the logical location, this feature can be overridden to allow the logical location to remain fixed, while the physical location is changed with the updated code. Thus, in some embodiments, the usability and desirability of an execute in place platform architecture can be achieved. In some embodiments, the FDI code manager may be integrated with the execute in place update capability to provide code management support for systems with memory management units and paging enabled.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

storing a page table in a random access memory;

updating outdated code stored in a flash memory by updating the page table to point to new code stored in the flash memory; and using a flash data integrator coupled to a real time operating system to execute the new code in flash memory.

2. The method of claim 1 including deleting the outdated code after updating the page table to point to the new code.

3. The method of claim 1 including storing the outdated code and the new code in the same flash memory.

4. The method of claim 1 including updating outdated code in the flash memory in an execute-in-place system without rebooting said system.

5. The method of claim 1 including using a memory management unit to assist in updating outdated code.

6. The method of claim 1 including using differencing technology to reduce the size of the new code.

7. The method of claim 1 including updating said outdated code without overwriting said code.

8. An article comprising a medium storing instructions that, if executed, enable a processor-based system to:

store a page table in a random access memory;

update outdated code stored in a flash memory by updating the page table to point to new code stored in the flash memory; and use a flash data integrator coupled to a real time operating system to execute the new code in flash memory.

9. The article of claim 8 further storing instructions that, if executed, enable a processor-based system to delete the outdated code after updating the page table to point to the new code.

10. The article of claim 8 further storing instructions that, if executed, enable a processor-based system to store the outdated code and the new code in the same flash memory.

11. The article of claim 8 further storing instructions that, if executed, enable a processor-based system to update outdated code in the flash memory in an execute-in-place system without rebooting said system.

12. The article of claim 8 further storing instructions that, if executed, enable a processor-based system to use a memory management unit to assist in updating outdated code.

13. The article of claim 8 further storing instructions that, if executed, enable a processor-based system to use differencing technology to reduce the size of the new code.

14. The article of claim 8 further storing instructions that, if executed, enable a processor-based system to update said outdated code without overwriting said code.

15. A system comprising:

a processor;

a memory management unit associated with said processor;

a random access memory also coupled to said processor, said random access memory storing a page table;

a flash memory coupled to said processor, said flash memory being updatable by updating the page table to point to new code stored in the flash memory; and a flash data integrator and a real time operating system coupled to said flash data integrator to execute code in said flash memory.

16. The system of claim 15 wherein said flash memory to delete outdated code after updating the page table to point to new code stored in said flash memory.

17. The system of claim 15 wherein said flash memory stores both outdated code and new code.

18. The system of claim 15 wherein said system is an execute-in-place system.

19. The system of claim 18 wherein said execute-in-place system can use the flash memory to update the code without rebooting said system.

* * * * *